(12) United States Patent
Matsuo et al.

(10) Patent No.: US 8,955,313 B2
(45) Date of Patent: Feb. 17, 2015

(54) EXHAUST PURIFICATION SYSTEM OF INTERNAL COMBUSTION ENGINE

(75) Inventors: Junichi Matsuo, Susono (JP); Hiromasa Nishioka, Susono (JP); Katsuhiko Oshikawa, Tokyo (JP); Yoshihisa Tsukamoto, Susono (JP); Hiroshi Otsuki, Susono (JP); Shigeki Nakayama, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/379,467

(22) PCT Filed: Feb. 18, 2011

(86) PCT No.: PCT/JP2011/054214
§ 371 (c)(1),
(2), (4) Date: Dec. 20, 2011

(87) PCT Pub. No.: WO2012/111172
PCT Pub. Date: Aug. 23, 2012

(65) Prior Publication Data
US 2013/0323130 A1 Dec. 5, 2013

(51) Int. Cl.
*F01N 3/00* (2006.01)
*F01N 3/10* (2006.01)
(Continued)

(52) U.S. Cl.
CPC ............... *F01N 3/0814* (2013.01); *B01J 23/50* (2013.01); *B01D 53/9418* (2013.01);
(Continued)

(58) Field of Classification Search
CPC .......... B01J 23/50; F01N 3/0814; B11J 23/50
USPC ...................................... 60/272–324
See application file for complete search history.

(56) References Cited

U.S. PATENT DOCUMENTS 6,732,507 B1 * 5/2004 Stanglmaier et al. ........... 60/285
7,541,010 B2 * 6/2009 Park et al. .................. 423/213.2
(Continued)

FOREIGN PATENT DOCUMENTS

EP      2 223 735 A1   9/2010
JP      B2-2801423     7/1998
(Continued)

*Primary Examiner* — Thomas Denion
*Assistant Examiner* — Anthony Ayala Delgado
(74) *Attorney, Agent, or Firm* — Oliff PLC

(57) ABSTRACT

An exhaust purification system of an internal combustion engine, which includes: a silver-alumina-based catalyst, which is arranged in an engine exhaust system and, when an air-fuel ratio of exhaust gas is leaner than a stoichiometric air-fuel ratio, releases adsorbed $NO_2$ at a first set temperature and adsorbed NO at a second set temperature, a secondary air feed passage configured to suppress a temperature rise of the silver-alumina-based catalyst; and an electronic control unit, that: controls the air flow through the secondary air feed passage to: when the silver-alumina-based catalyst has reached a third set temperature, suppress a temperature rise of the silver-alumina-based catalyst to maintain the silver-alumina-based catalyst near the third set temperature, and then lift the suppression of the temperature rise of the silver-alumina-based catalyst so that at least part of the NO adsorbed at the silver-alumina-based catalyst, is oxidized to $NO_2$ to be adsorbed at the silver-alumina-based catalyst.

13 Claims, 4 Drawing Sheets

(51) Int. Cl.
*F01N 3/08* (2006.01)
*B01J 23/50* (2006.01)
*B01D 53/94* (2006.01)
*B01J 37/02* (2006.01)
*B01J 35/00* (2006.01)

(52) U.S. Cl.
CPC .......... *B01D 53/945* (2013.01); *B01J 37/0242* (2013.01); *B01J 37/0244* (2013.01); *B01J 35/0006* (2013.01); *B01D 2255/104* (2013.01); *B01D 2255/2092* (2013.01); *B01D 2255/91* (2013.01); *Y02T 10/22* (2013.01); *Y02T 10/24* (2013.01)
USPC .................. 60/299; 60/295; 60/286; 60/289; 60/301; 60/303

(56) References Cited

U.S. PATENT DOCUMENTS

| | | | |
|---|---|---|---|
| 8,006,481 B2* | 8/2011 | Schmieg et al. | 60/286 |
| 8,580,216 B2* | 11/2013 | Malyala et al. | 423/239.1 |
| 8,677,735 B2* | 3/2014 | Imai | 60/285 |
| 2006/0037312 A1* | 2/2006 | Yoshida et al. | 60/295 |
| 2010/0101421 A1 | 4/2010 | Kanazawa et al. | |
| 2010/0287918 A1 | 11/2010 | Kuwajima | |

FOREIGN PATENT DOCUMENTS

| | | |
|---|---|---|
| JP | A-2008-240568 | 10/2008 |
| JP | A-2008-261252 | 10/2008 |
| JP | A-2009-112948 | 5/2009 |
| JP | A-2009-112967 | 5/2009 |
| JP | A-2009-160548 | 7/2009 |

* cited by examiner

EXHAUST GAS FLOW

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is a catalyst which uses alumina as a carrier coat material and which carries silver oxide (for example, refer to Japanese Patent No. 2801423, Japanese Patent Publication No. 2008-240568, and Japanese Patent Publication No. 2009-160548). Such a silver-alumina-based catalyst absorbs the $NO_2$ in the exhaust gas when the air-fuel ratio of the exhaust gas is leaner than a stoichiometric air-fuel ratio and releases the $NO_2$ which was adsorbed when it becomes a set temperature. When the silver-alumina-based catalyst becomes the set temperature, the $NO_x$ catalyst which was arranged at the downstream side is activated and can purify by reduction the $NO_2$ which flows out from the silver-alumina-based catalyst.

DISCLOSURE OF THE INVENTION

The above-mentioned silver-alumina-based catalyst not only adsorbs the $NO_2$ in the exhaust gas, but also adsorbs the NO in the exhaust gas. However, the adsorbed NO ends up being released at a temperature lower than the set temperature. At this time, the $NO_x$ catalyst which is arranged at the downstream side is not activated, so the NO which flows out from the silver-alumina-based catalyst ends up being discharged into the atmosphere without being purified by reduction at the $NO_x$ catalyst.

Therefore, an object of the present invention is to provide an exhaust purification system of an internal combustion engine with a silver-alumina-based catalyst wherein when the temperature is lower than the set temperature at which $NO_2$ is released, the amount of NO which flows out from the silver-alumina-based catalyst is reduced.

The exhaust purification system of an internal combustion engine as set forth in claim 1, of the present invention is characterized in that the system, comprises: a silver-alumina-based catalyst, which: (i) comprises a base material on which is formed a carrier, which carries silver oxide, (ii) is arranged in an engine exhaust system and, (iii) when an air-fuel ratio of exhaust gas is leaner than a stoichiometric air-fuel ratio, releases adsorbed $NO_2$ at a first set temperature and releases adsorbed NO at a second set temperature, which is lower than the first set temperature, a secondary air feed passage configured to suppress a temperature rise of the silver-alumina-based catalyst; and an electronic control unit, that: presets a third set temperature, and controls the air flow through the secondary air feed passage to: when the silver-alumina-based catalyst has reached the third set temperature, which is lower than the second set temperature, suppress a temperature rise of the silver-alumina-based catalyst to maintain the silver-alumina-based catalyst near the third set temperature, and then lift the suppression of the temperature rise of the silver-alumina-based catalyst so that at least part of the NO, which is adsorbed at the silver-alumina-based catalyst, is oxidized to $NO_2$ to be adsorbed at the silver-alumina-based catalyst.

The exhaust purification system of an internal combustion engine as set forth in claim 2 of the present invention is characterized in that in the exhaust purification system of an internal combustion engine as set forth in claim 1, wherein the electronic control unit: is further configured to judge whether there is no longer any NO adsorbed at the silver-alumina-based catalyst, and when it is judged that there is no longer any NO adsorbed at the silver-alumina-based catalyst, controls the air flow through the secondary air feed passage to lift the suppression of the temperature rise of the silver-alumina-based catalyst.

The exhaust purification system of an internal combustion engine as set forth in claim 3 is characterized in that in the exhaust purification system of an internal combustion engine as set forth in claim 1, further comprising: a $NO_x$ reduction catalyst arranged at a downstream side of the silver-alumina-based catalyst; and a reducing agent feed passage, wherein the electronic control unit is further configured to: judge whether the $NO_x$ reduction catalyst is activated, judge whether the $NO_2$ amount adsorbed at the silver-alumina-based catalyst has reached a set amount, and when (i) the suppression of the temperature rise of the silver-alumina-based catalyst is lifted or after the suppression of the temperature rise of the silver-alumina-based catalyst is lifted, (ii) it is judged that the $NO_x$ reduction catalyst is activated and (iii) it is judged that the $NO_2$ amount adsorbed at the silver-alumina-based catalyst has reached the set amount, control the air flow through the reducing agent feed passage to make the air-fuel ratio of the exhaust gas, which flows into the silver-alumina-based catalyst richer than the stoichiometric air-fuel ratio.

The exhaust purification system of an internal combustion engine as set forth in claim 4 of the present invention is characterised in that in the exhaust purification system of an internal combustion engine as set forth in claim 1, further comprises: a $NO_x$ reduction catalyst arranged at a downstream side of the silver-alumina-based catalyst; and a reducing agent feed passage, wherein the electronic control unit is further configured to, when (i) the suppression of the temperature rise of the silver-alumina-based catalyst is lifted or after the suppression of the temperature rise of the silver-alumina-based catalyst is lifted, and (ii) the silver-alumina-based catalyst has been raised in temperature to the first set temperature or higher, control the air flow through the reducing agent feed passage to make the air-fuel ratio of the exhaust gas, which flows into the silver-alumina-based catalyst richer than the stoichiometric air-fuel ratio.

The exhaust purification system of an internal combustion engine as set forth in claim 5 of the present invention is characterised in that in the exhaust purification system of an internal combustion engine as set forth in claim 1, further comprises: a $NO_x$ reduction catalyst arranged at a downstream side of the silver-alumina-based catalyst; and a reducing agent feed passage, wherein the electronic control unit is further configured to: judge whether the $NO_x$ reduction catalyst is activated, judge whether the $NO_2$ amount adsorbed at the silver-alumina-based catalyst has reached a set amount, and when (i) it is judged that the $NO_x$ reduction catalyst is activated if the suppression of the temperature rise of the silver-alumina-based catalyst is lifted, and (ii) it is judged that the $NO_2$ amount adsorbed at the silver-alumina-based catalyst has reached the set amount, control: (a) the air flow through the secondary air feed passage to lift the suppression of the temperature rise of the silver-alumina-based catalyst, and (b) the reducing agent feed passage to make the air-fuel ratio of the exhaust gas, which flows into the silver-alumina-based catalyst, richer than the stoichiometric air-fuel ratio.

The exhaust purification system of an internal combustion engine as set forth in claim 6 of the present invention is characterized in that in the exhaust purification system of an internal combustion engine as set forth in claim 3, further comprises: an electric heater, wherein the electronic control unit is further configured to: estimate a target temperature of the $NO_x$ reduction catalyst, and control the electric heater to raise the temperature of the $NO_x$ reduction catalyst, and when the electronic control unit controls the air flow through the reducing agent feed passage to make the air-fuel ratio of the exhaust gas, which flows into the silver-alumina-based catalyst, richer than the stoichiometric air-fuel ratio, the electronic control unit: controls the air flow through the reducing agent feed passage to make the air-fuel ratio of the exhaust gas, which flows into the silver-alumina-based catalyst, a set rich air-fuel ratio at exactly a set time, estimates the target temperature of the $NO_x$ reduction catalyst for giving rise to a $NO_x$ reduction rate which is equal to a $NO_2$ release rate of the silver-alumina-based catalyst at the set time, and controls the electric heater to raise the temperature of the $NO_x$ reduction catalyst to the target temperature or higher.

The exhaust purification system of an internal combustion engine as set forth in claim 7 of the present invention is characterized in that in the exhaust purification system of an internal combustion engine as set forth in claim 1, further comprises: a $NO_x$ reduction catalyst arranged at a downstream side of the silver-alumina-based catalyst; and a reducing agent feed passage, wherein the electronic control unit is further configured to: judge whether the $NO_x$ reduction catalyst is activated, and when it is judged that the $NO_x$ reduction catalyst is activated if the suppression of the temperature rise of the silver-alumina-based catalyst is lifted, control: (i) the secondary air feed passage to lift the suppression of the temperature rise of the silver-alumina-based catalyst and (ii) the reducing agent feed passage to make the air-fuel ratio of the exhaust gas, which flows into the silver-alumina-based catalyst, richer than the stoichiometric air-fuel ratio.

According to the exhaust purification system of an internal combustion engine according to the present invention as set forth in claim 1, the system, comprises: a silver-alumina-based catalyst, which: (i) comprises a base material on which is formed a carrier, which carries silver oxide, (ii) is arranged in an engine exhaust system and, (iii) when an air-fuel ratio of exhaust gas is leaner than a stoichiometric air-fuel ratio, releases adsorbed $NO_2$ at a first set temperature and releases adsorbed NO at a second set temperature, which is lower than the first set temperature, a secondary air feed passage configured to suppress a temperature rise of the silver-alumina-based catalyst; and an electronic control unit, that: presets a third set temperature, and controls the air flow through the secondary air feed passage to: when the silver-alumina-based catalyst has reached the third set temperature, which is lower than the second set temperature, suppress a temperature rise of the silver-alumina-based catalyst to maintain the silver-alumina-based catalyst near the third set temperature, and then lift the suppression of the temperature rise of the silver-alumina-based catalyst so that at least part of the NO, which is adsorbed at the silver-alumina-based catalyst, is oxidized to $NO_2$ to be adsorbed at the silver-alumina-based catalyst. Due to this, it is possible to reduce the amount of NO which is adsorbed at the silver-alumina-based catalyst. Even when suppression of the temperature rise of the silver-alumina-based catalyst is lifted and the silver-alumina-based catalyst becomes the second set temperature whereby the silver-alumina-based catalyst releases NO, the amount of NO which flows out from the silver-alumina-based catalyst can be reduced.

According to the exhaust purification system of an internal combustion engine as set forth in claim 2 of the present invention, in the exhaust purification system of an internal combustion engine as set forth in claim 1, wherein the electronic control unit: is further configured to judge whether there is no longer any NO adsorbed at the silver-alumina-based catalyst, and when it is judged that there is no longer any NO adsorbed at the silver-alumina-based catalyst, controls the air flow through the secondary air feed passage to lift the suppression of the temperature rise of the silver-alumina-based catalyst. Due to this, even when the silver-alumina-based catalyst becomes the second set temperature, the silver-alumina-based catalyst releases almost no NO.

According to the exhaust purification system of an internal combustion engine as set forth in claim 3 of the present invention, in the exhaust purification system of an internal combustion engine as set forth in claim 1, further comprising: a $NO_x$ reduction catalyst arranged at a downstream side of the silver-alumina-based catalyst; and a reducing agent feed passage, wherein the electronic control unit is further configured to: judge whether the $NO_x$ reduction catalyst is activated, judge whether the $NO_2$ amount adsorbed at the silver-alumina-based catalyst has reached a set amount, and when (i) the suppression of the temperature rise of the silver-alumina-based catalyst is lifted or after the suppression of the temperature rise of the silver-alumina-based catalyst is lifted, (ii) it is judged that the $NO_x$ reduction catalyst is activated and (iii) it is judged that the $NO_2$ amount adsorbed at the silver-alumina-based catalyst has reached the set amount, control the air flow through the reducing agent feed passage to make the air-fuel ratio of the exhaust gas, which flows into the silver-alumina-based catalyst richer than the stoichiometric air-fuel ratio. Due to this, before the silver-alumina-based catalyst can no longer adsorb $NO_2$, it is possible to make the air-fuel ratio of the exhaust gas rich so as to make the silver-alumina-based catalyst release $NO_2$ even at a temperature lower than the first set temperature. Thus, the released $NO_2$ can be purified by reduction at the activated $NO_x$ reduction catalyst, which is arranged at the downstream side of the silver-alumina-based catalyst, using the reducing substances in the rich air-fuel ratio exhaust gas.

According to the exhaust purification system of an internal combustion engine as set forth in claim 4 of the present invention, in the exhaust purification system of an internal combustion engine as set forth in claim, further comprises: a $NO_x$ reduction catalyst arranged at a downstream side of the silver-alumina-based catalyst; and a reducing agent feed passage, wherein the electronic control unit is further configured to, when (i) the suppression of the temperature rise of the silver-alumina-based catalyst is lifted or after the suppression of the temperature rise of the silver-alumina-based catalyst is lifted, and (ii) the silver-alumina-based catalyst has been raised in temperature to the first set temperature or higher, control the air flow through the reducing agent feed passage to make the air-fuel ratio of the exhaust gas, which flows into the silver-alumina-based catalyst richer than the stoichiometric air-fuel ratio. Thus, the released $NO_2$ can be purified by reduction at the activated $NO_x$ reduction catalyst, which is arranged at the downstream side of the silver-alumina-based catalyst, using the reducing substances in the rich air-fuel ratio exhaust gas.

According to the exhaust purification system of an internal combustion engine as set forth in claim 5 of the present invention, in the exhaust purification system of an internal combustion engine as set forth in claim 1, further comprises: a $NO_x$ reduction catalyst arranged at a downstream side of the silver-alumina-based catalyst; and a reducing agent feed passage, wherein the electronic control unit is further configured to: judge whether the $NO_x$ reduction catalyst is activated, judge whether the $NO_2$ amount adsorbed at the silver-alumina-based catalyst has reached a set amount, and when (i) it is judged that the $NO_x$ reduction catalyst is activated if the suppression of the temperature rise of the silver-alumina-based catalyst is lifted, and (ii) it is judged that the $NO_2$ amount adsorbed at the silver-alumina-based catalyst has reached the set amount, control: (a) the air flow through the secondary air feed passage to lift the suppression of the temperature rise of the silver-alumina-based catalyst, and (b) the reducing agent feed passage to make the air-fuel ratio of the exhaust gas, which flows into the silver-alumina-based catalyst, richer than the stoichiometric air-fuel ratio. Due to this, before the silver-alumina-based catalyst can no longer adsorb $NO_2$, it is possible to lift the suppression of the temperature rise of the silver-alumina-based catalyst and make the air-fuel ratio of the exhaust gas rich so as to enable the silver-alumina-based catalyst to release $NO_2$ even at a temperature lower than the first set temperature. Thus, the released $NO_2$ can be purified by reduction at the activated $NO_x$ reduction catalyst, which is arranged at the downstream side of the silver-alumina-based catalyst, using the reducing substances in the rich air-fuel ratio exhaust gas.

According to the exhaust purification system of an internal combustion engine as set forth in claim 6 of the present invention, in the exhaust purification system of an internal combustion engine as set forth in claim 3, further comprises: an electric heater, wherein the electronic control unit is further configured to: estimate a target temperature of the $NO_x$ reduction catalyst, and control the electric heater to raise the temperature of the $NO_x$ reduction catalyst, and when the electronic control unit controls the air flow through the reducing agent feed passage to make the air-fuel ratio of the exhaust gas, which flows into the silver-alumina-based catalyst, richer than the stoichiometric air-fuel ratio, the electronic control unit: controls the air flow through the reducing agent feed passage to make the air-fuel ratio of the exhaust gas, which flows into the silver-alumina-based catalyst, a set rich air-fuel ratio at exactly a set time, estimates the target temperature of the $NO_x$ reduction catalyst for giving rise to a $NO_x$ reduction rate which is equal to a $NO_2$ release rate of the silver-alumina-based catalyst at the set time, and controls the electric heater to raise the temperature of the $NO_x$ reduction catalyst to the target temperature or higher. Due to this, almost all of the $NO_2$ which is released from the silver-alumina-based catalyst can be purified by reduction at the $NO_x$ reduction catalyst.

According to the exhaust purification system of an internal combustion engine as set forth in claim 7 of the present invention, in the exhaust purification system of an internal combustion engine as set forth in claim 1, further comprises: a $NO_x$ reduction catalyst arranged at a downstream side of the silver-alumina-based catalyst; and a reducing agent feed passage, wherein the electronic control unit is further configured to: judge whether the $NO_x$ reduction catalyst is activated, and when it is judged that the $NO_x$ reduction catalyst is activated if the suppression of the temperature rise of the silver-alumina-based catalyst is lifted, control: (i) the air flow through the secondary air feed passage to lift the suppression of the temperature rise of the silver-alumina-based catalyst and (ii) the reducing agent feed passage to make the air-fuel ratio of the exhaust gas, which flows into the silver-alumina-based catalyst, richer than the stoichiometric air-fuel ratio. Due to this, even if suppression of the temperature rise of the silver-alumina-based catalyst is lifted, the silver-alumina-based catalyst becomes the second set temperature or more, and NO is released, this can be purified by reduction at the activated $NO_x$ reduction catalyst which is arranged at the downstream side of the silver-alumina-based catalyst using the reducing substances in the rich air-fuel ratio exhaust gas.

BEST MODE FOR CARRYING OUT THE INVENTION

Figure 1:
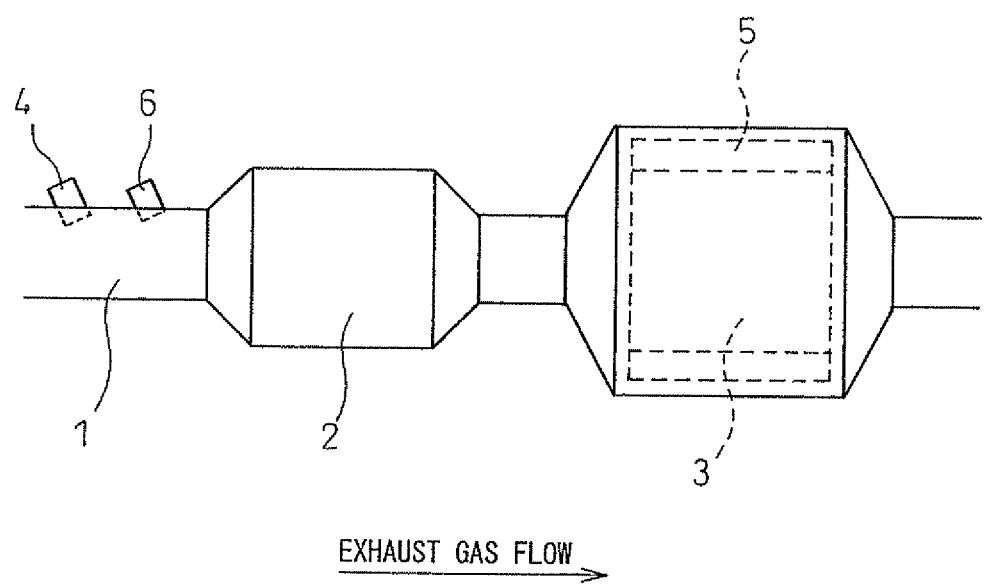
FIG. 1 is a schematic view of an embodiment of an exhaust purification system of an internal combustion engine according to the present invention.

FIG. 1 is a schematic view of an embodiment of an exhaust purification system of an internal combustion engine according to the present invention. In the figure, 1 indicates an exhaust passage of the internal combustion engine. The internal combustion engine is a diesel engine or a direct fuel injection-type spark-ignition internal combustion engine or other such internal combustion engine which performs lean combustion. The exhaust gas of such an internal combustion engine contains a relatively large amount of $NO_x$, so a silver-alumina-based catalyst 2 for adsorbing the $NO_x$ is arranged in the exhaust passage 1. Further, at a downstream side of the silver-alumina-based catalyst 2, an $NO_x$ reduction catalyst 3 is arranged for reducing the $NO_x$. Upstream of the silver-alumina-based catalyst 2, a reducing agent feed passage 4 is arranged for feeding a reducing agent. Further, around the $NO_x$ reduction catalyst 3, an electric heater 5 is arranged for heating the $NO_x$ reduction catalyst 3. Further, at the immediate upstream side of the silver-alumina-based catalyst 2, to suppress the temperature rise of the silver-alumina-based catalyst 2, a secondary air feed passage 6 is arranged for feeding secondary air to the silver-alumina-based catalyst 2.

The silver-alumina-based catalyst 2 uses alumina as a carrier coating material and carries silver oxide. The $NO_2$ in the exhaust gas can be adsorbed as silver nitrate and, when the air-fuel ratio of the exhaust gas which flows into the silver-alumina-based catalyst 2 is leaner than the stoichiometric air-fuel ratio, if the first set temperature (about 300° C.) is reached, the adsorbed $NO_2$ is released. At this time, the $NO_x$ reduction catalyst 3 is sufficiently activated, and the released $NO_2$ can be purified by reduction at the $NO_x$ reduction catalyst 3 by a reducing agent which is fed from the reducing agent feed passage 4. In this way, by arranging the silver-alumina-based catalyst 2 at the upstream side of the $NO_x$ reduction catalyst 3, before the $NO_x$ reduction catalyst 3 is activated, it is possible to sufficiently keep the $NO_2$ in the exhaust gas from being released into the atmosphere.

The silver-alumina-based catalyst 2, for example, comprises a honeycomb-shaped base material on which an alumina $Al_2O_3$ carrier coat layer is formed and carrying silver oxide $Ag_2O$ on the alumina carrier coat layer in a ratio of silver 0.2 mol to alumina 200 g (for improving the heat resistance, lanthanum La may also be mixed in).

As the method of preparation of such a catalyst, for example, alumina MI386 ($La/Al_2O_3$) powder 1600 g, a binder A520 710.4 g, and water 3600 g are stirred by an atriter for 20 minutes, then the mixture is coated on the base material at 200 g/liter per unit volume. Next, this is fired in the atmosphere at 250° C. for 30 minutes, then fired at 500° C. for 1 hour to form an alumina carrier coat layer on the base material.

On the other hand, ion exchanged water is added to silver nitrate 236.2 g to make it dissolve to give a volume of 1700 cc to thereby prepare a silver nitrate aqueous solution with an Ag concentration of 0.82 mol/liter.

The above-mentioned alumina carrier coat layer is immersed in such a silver nitrate aqueous solution for 30 minutes to cause Ag to be carried at 0.2 mol/liter per unit volume by absorption. Next, a blower type dryer is operated to dry the catalyst for 20 minutes, the catalyst is fired in the atmosphere at 550° C. for 3 hours, then the catalyst is fired at 500° C. for 3 hours while running nitrogen containing 5% of hydrogen at a rate of 7 liters a minute.

In a catalyst which is prepared in this way, the silver oxide $Ag_2O$ is exposed from the alumina $Al_2O_3$ carrier coat layer. After the NO in the exhaust gas is oxidized to $NO_2$, this can be held well as silver nitrate $AgNO_3$.

The $NO_x$ reduction catalyst 3 can be made a three-way catalyst. In this case, from the reducing agent feed passage 4, as the reducing agent, for example, the fuel is fed. The air-fuel ratio of the exhaust gas in the three-way catalyst is made rich to purify the $NO_x$ by reduction.

Further, the $NO_x$ reduction catalyst 3 can be made a selective reduction type $NO_x$ catalyst which uses ammonia $NH_3$ to selectively purify $NO_x$ by reduction. In this case, the reducing agent feed passage 4 feeds urea as a reducing agent, for example. At the selective reduction type $NO_x$ catalyst, the urea is hydrolyzed to generate ammonia to purify the $NO_x$ by reduction.

Further, if the $NO_x$ reduction catalyst 3 is comprised of an upstream side oxidation catalyst (carrying platinum Pt, silver Ag, copper Cu, etc.) which can partially oxidize the hydrocarbons in the exhaust gas and a downstream side catalyst (carrying platinum Pt or rhodium Rh) which purify nitrogen-containing hydrocarbon compounds (amine compounds, isocyanate compounds, and nitroso compounds) generated in the oxidation catalyst from the partially oxidized hydrocarbons and $NO_x$ in the exhaust gas, hydrocarbons (fuel) are fed as a reducing agent from the reducing agent feed passage 4 for purifying the $NO_x$. In particular, if the fed hydrocarbons are used to make the air-fuel ratio of the exhaust gas a 15.5 or less lean air-fuel ratio, the nitrogen-containing hydrocarbon compounds become easier to generate in the oxidation catalyst and substantially all of the $NO_x$ in the exhaust gas can be purified.

As explained above, until the silver-alumina-based catalyst 2 becomes the first set temperature T1, the $NO_2$ in the exhaust gas which is adsorbed as silver nitrate $AgNO_3$ is released when the silver-alumina-based catalyst 2 becomes the first set temperature T1. At this time, the downstream side $NO_x$ reduction catalyst 3 becomes the activation temperature (about 200° C.) or more, and the released $NO_2$ can be purified by reduction by the $NO_x$ reduction catalyst 3.

On the other hand, the NO in the exhaust gas is adsorbed at the silver-alumina-based catalyst 2, but the NO is adsorbed at the silver-alumina-based catalyst 2 as silver nitrite $AgNO_2$. The NO which is adsorbed as silver nitrite ends up being released from the silver-alumina-based catalyst 2 at a second set temperature T2 (about 150° C.) which is lower than the first set temperature T1. At this time, the downstream side $NO_x$ reduction catalyst 3 is not sufficiently activated, and the NO which flows out from the silver-alumina-based catalyst 2 ends up being released into the atmosphere without being purified by reduction at the $NO_x$ reduction catalyst 3.

Due to this, at the second set temperature T2 which is lower than the first set temperature T1 at which $NO_2$ is released, it is desirable to reduce the amount of NO which flows out from the silver-alumina-based catalyst.

Figure 2:
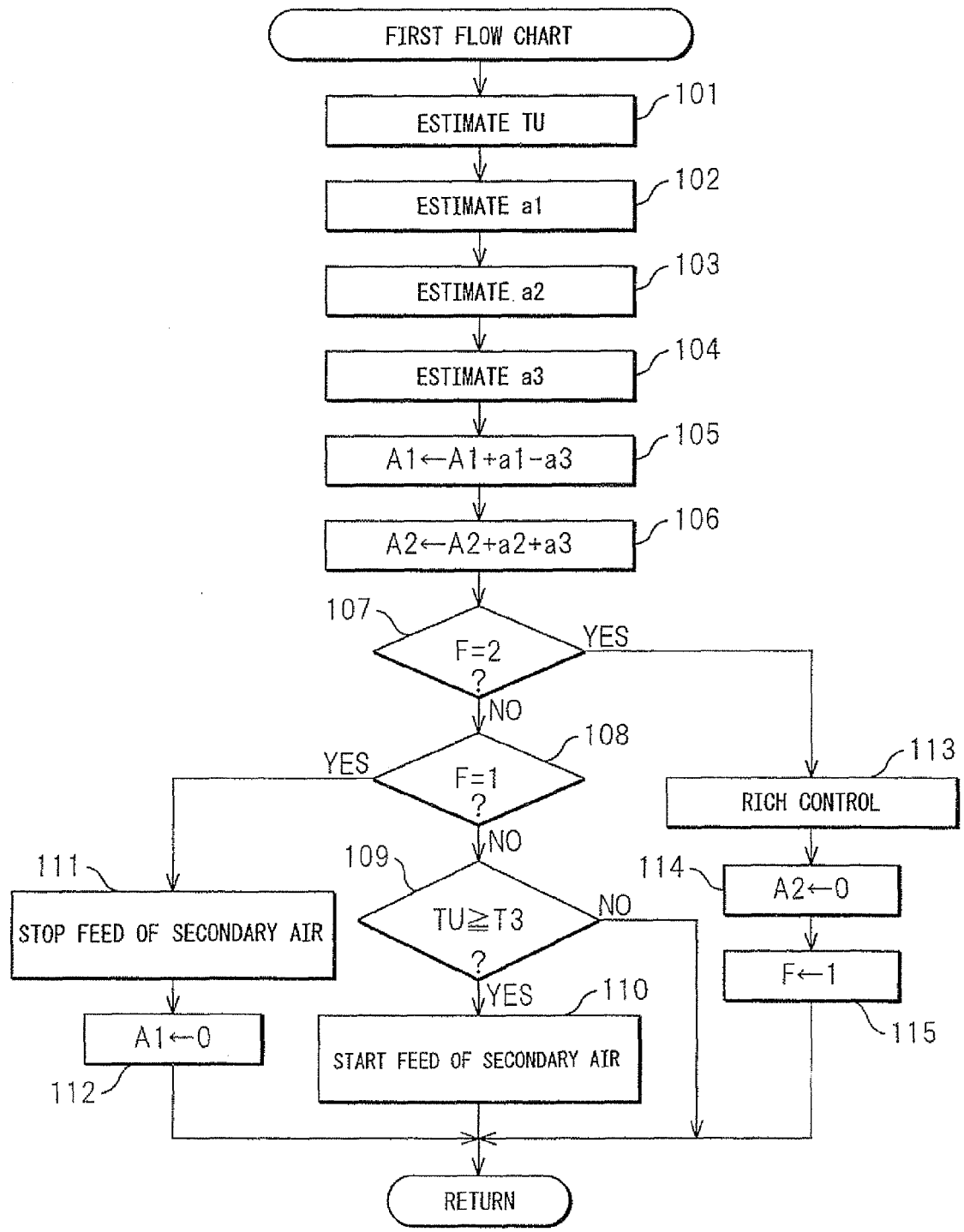
FIG. 2 is a first flow chart showing control which is performed in an exhaust purification system according to the present invention.

To realize this, the exhaust purification system of an internal combustion engine of the present embodiment is controlled by an electronic control unit (not shown) in accordance with the flow of the first flow chart shown in FIG. 2. The flow of the first flow chart of FIG. 2 is started at the same time as engine startup.

First, at step 101, the current temperature TU of the silver-alumina-based catalyst 2 is estimated. For example, a temperature sensor may be arranged at the immediate downstream side of the silver-alumina-based catalyst 2 to measure the temperature of the exhaust gas which flows from the silver-alumina-based catalyst 2 and the measured temperature may be used as the current temperature TU of the silver-alumina-based catalyst 2. Further, the temperature of the exhaust gas which flows into the silver-alumina-based catalyst 2 which is estimated based on the current engine operating state may be used as the basis to estimate the current temperature TU of the silver-alumina-based catalyst 2. Further, the temperature of the silver-alumina-based catalyst 2 may be measured directly.

Next, at step 102, the NO amount a1 which is discharged from each cylinder per unit time (interval of execution of flow chart) and is newly adsorbed as silver nitrite $AgNO_2$ at the silver-alumina-based catalyst 2 is estimated based on the current engine operating state. For example, such an NO amount a1 may be mapped for each engine operating state based on experiments and such a map may be utilized for the estimation of step 102.

Next, at step 103, the $NO_2$ amount a2 which is discharged from each cylinder per unit time (interval of execution of flow chart) and is newly adsorbed as silver nitrate $AgNO_3$ at the silver-alumina-based catalyst 2 is estimated based on the current engine operating state. For example, such an $NO_2$ amount a2 may be mapped for each engine operating state based on experiments and such a map may be utilized for the estimation of step 103.

Next, at step 104, the oxidation amount a3 of the NO adsorbed at the silver-alumina-based catalyst 2 as silver nitrite $AgNO_2$ to be oxidized and adsorbed as silver nitrate $AgNO_3$ per unit time (interval of execution of flow chart) is estimated on the basis of the current temperature TU of the silver-alumina-based catalyst 2 which is estimated at step 101 and the NO amount A1 which is adsorbed at the silver-alumina-based catalyst 2 as silver nitrite $AgNO_2$ (calculated at step 105). For example, such an oxidation amount a3 becomes greater the higher the current temperature TU of the silver-alumina-based catalyst 2. Further, it becomes greater the greater the NO amount A1 which is adsorbed at the silver-alumina-based catalyst 2 as silver nitrite $AgNO_2$. The oxidation amount a3 can be mapped by experiments and such a map may be utilized for the estimation of step 104.

Next, at step 105, the NO amount a1 which was estimated at step 102 is added and the oxidation amount a3 which was estimated at step 104 is subtracted so as to calculate the current NO adsorption amount A1 at the silver-alumina-based catalyst 2. At step 106, the $NO_2$ amount a2 which was estimated at step 103 is added and the oxidation amount a3 which was estimated at step 104 is also added so as to calculate the current $NO_2$ adsorption amount A2 at the silver-alumina-based catalyst 2.

Next, at step 107, it is judged if the flag F is "2" or not. The flag F is reset to "0" simultaneously with the engine being stopped. First, the judgment at step 107 is negative and the routine proceeds to step 108. At step 108, it is judged if the flag F is "1". At first, this judgment is also negative and the routine proceeds to step 109.

At step 109, it is judged if the current temperature TU of the silver-alumina-based catalyst 2 which was estimated at step 101 has reached the third set temperature T3. The third set temperature T3 is a temperature slightly lower than the second set temperature T2 at which the silver-alumina-based catalyst 2 releases NO which is adsorbed as silver nitrite (for example, about 130° C.). If the silver-alumina-based catalyst 2 is the third set temperature T3 or less, the silver-alumina-based catalyst 2 will not release almost any NO. The third set temperature T3 is preferably made the upper limit temperature at which the silver-alumina-based catalyst 2 does not release almost any NO. When the judgment at step 109 is negative, the routine ends as is.

Along with the rise of the exhaust gas temperature, the temperature TU of the silver-alumina-based catalyst 2 gradually rises. When reaching the third set temperature T3, the judgment at step 109 is affirmative. Then at step 110, the secondary air feed passage 6 feeds secondary air, the temperature rise of the silver-alumina-based catalyst 2 is suppressed, and the temperature TU of the silver-alumina-based catalyst 2 is maintained near the third set temperature T3. The secondary air feed passage 6, for example, feeds air which is sucked in from the downstream side of the air cleaner of the intake system (preferably at the upstream side from the air flow meter) to the side immediately upstream of the silver-alumina-based catalyst 2 of the exhaust system. By feeding a larger amount of air the higher the temperature of the exhaust gas which flows into the silver-alumina-based catalyst 2, the temperature of the silver-alumina-based catalyst 2 is maintained near the third set temperature T3.

Even while the secondary air feed passage 6 is being used so that the secondary air is fed to the silver-alumina-based catalyst 2 in this way, at step 101, the temperature TU of the silver-alumina-based catalyst 2 is estimated, at step 105, the current NO adsorption amount A1 at the silver-alumina-based catalyst 2 is calculated, and, at step 106, the current $NO_2$ adsorption amount A2 at the silver-alumina-based catalyst 2 is calculated.

Figure 3:
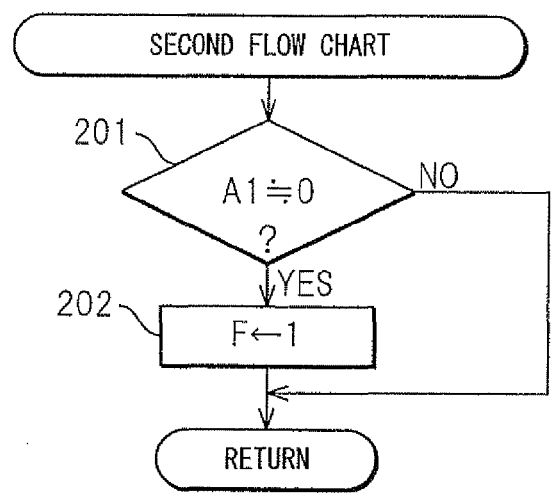
FIG. 3 is a second flow chart for setting a flag of the first flow chart of FIG. 2 to "1".

FIG. 3 is a second flow chart for setting the flag F to "1" and shows a flow which is performed only while the flag F is made "0". First, at step 201, it is judged if the current NO adsorption amount A1 at the silver-alumina-based catalyst 2 is about 0. When this judgment is negative, the judgment at step 201 is repeated.

While the silver-alumina-based catalyst 2 is low in temperature, the amount a1 of NO which is newly adsorbed at the silver-alumina-based catalyst 2 as silver nitrite $AgNO_2$ is larger than the amount a3 of oxidation of the NO adsorbed at the silver-alumina-based catalyst 2 to be oxidized and adsorbed as silver nitrate $AgNO_3$, so the current NO adsorption amount A1 at the silver-alumina-based catalyst 2 increases. However, if the temperature of the silver-alumina-based catalyst 2 becomes near the third set temperature T3, the amount a3 of oxidation of the NO adsorbed at the silver-alumina-based catalyst 2 being oxidized and adsorbed as silver nitrate $AgNO_3$ becomes larger than the amount a1 of NO which is newly adsorbed at the silver-alumina-based catalyst 2 as silver nitrite $AgNO_2$. The current NO adsorption amount A1 at the silver-alumina-based catalyst 2 is reduced.

Due to this, by maintaining the silver-alumina-based catalyst 2 near the third set temperature T3, the current NO adsorption amount A1 at the silver-alumina-based catalyst 2 gradually decreases. Finally, it becomes substantially 0 and the judgment at step 201 is affirmative. If the judgment at step 201 is affirmative, at step 202, the flag F is set to "1".

If in this way the flag F is set to "1", the judgment at step 108 of the first flow chart of FIG. 2 is affirmative, while at step 111, the feed of the secondary air by the secondary air feed passage 6 is stopped and the suppression of the temperature rise of the silver-alumina-based catalyst 2 is lifted. When the temperature rise of the silver-alumina-based catalyst 2 is being suppressed, the temperature of the exhaust gas becomes relatively high. If the suppression of the temperature rise is lifted, the temperature of the silver-alumina-based catalyst 2 rapidly rises and becomes the second set temperature T2 or more, but the silver-alumina-based catalyst 2 does not adsorb almost any NO. At this time, the silver-alumina-based catalyst 2 does not release almost any NO. Next, at step 112, the current NO adsorption amount A1 at the silver-alumina-based catalyst 2 is reset to 0.

In the second flow chart of FIG. 3, when the current NO adsorption amount A1 at the silver-alumina-based catalyst 2 becomes substantially "0", the flag F is set to "1" and the suppression of the temperature rise of the silver-alumina-based catalyst 2 is lifted. However, for example, if suppressing the temperature rise of the silver-alumina-based catalyst 2 for exactly the set time and maintaining the silver-alumina-based catalyst 2 near the third set temperature, at least part of the NO which is adsorbed at the silver-alumina-based catalyst 2 is oxidized to $NO_2$ and made to be adsorbed at the silver-alumina-based catalyst, so it is possible to reduce the amount of NO which is adsorbed at the silver-alumina-based catalyst 2. Due to this, when lifting the suppression of the temperature rise of the silver-alumina-based catalyst 2, even if the silver-alumina-based catalyst 2 becomes the second set temperature T2 and the silver-alumina-based catalyst 2 releases NO, the amount of NO which flows out from the silver-alumina-based catalyst 2 can be reduced.

Figure 4:
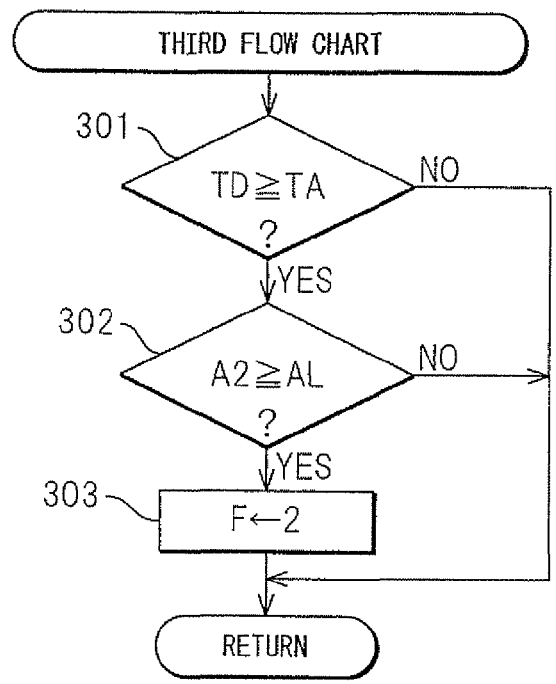
FIG. 4 is a third flow chart for setting a flag of the first flow chart of FIG. 2 to "2".

FIG. 4 is a third flow chart for setting the flag F at "2". This flow is performed only while the flag F is made "1". First, at step 301, it is judged if the temperature TD of the $NO_x$ reduction catalyst 3 which is positioned at the downstream side of the silver-alumina-based catalyst 2 is the activation temperature TA or more. The temperature TD of the $NO_x$ reduction catalyst 3 can be estimated by a method similar to the temperature TU of the silver-alumina-based catalyst 2. When this judgment is negative, the routine ends as is.

On the other hand, when the temperature TD of the $NO_x$ reduction catalyst 3 is the activation temperature TA or more, the judgment at step 301 is affirmative. At step 302, it is judged if the current $NO_2$ adsorption amount A2 at the silver-alumina-based catalyst 2 has reached the set amount AL, for example, the $NO_2$ adsorption limit amount at the silver-alumina-based catalyst 2. When this judgment is negative, the routine ends as is, while when this judgment is affirmative, at step 302, the flag F is made "2".

When the temperature TU of the silver-alumina-based catalyst 2 is the second set temperature T2 or more, NO is not newly adsorbed at the silver-alumina-based catalyst 2. Further, NO is not adsorbed at the silver-alumina-based catalyst 2, so is not oxidized to $NO_2$ either. The NO amount a1 at step 102 of the first flow chart and the oxidation amount a3 at step 104 both become zero.

However, even while the $NO_2$ in the exhaust gas is adsorbed at the silver-alumina-based catalyst 2, the NO in the exhaust gas is oxidized to $NO_2$ and adsorbed. While the flag F is "1", at step 103 of the first flow chart, the $NO_2$ amount a2 is estimated and the current $NO_2$ adsorption amount A2 of the silver-alumina-based catalyst 2 which is calculated at step 106 gradually increases and finally reaches the set amount AL.

If the flag F is set to "2" in this way, the judgment of step 107 of the first flow chart of FIG. 2 is affirmative. At step 113, as rich control, the reducing agent feed passage 4 feeds the fuel to make the air-fuel ratio of the exhaust gas which flows into the silver-alumina-based catalyst 2 richer than the stoichiometric air-fuel ratio. Due to this, even if the temperature of the silver-alumina-based catalyst 2 is not the first set temperature T1, the silver-alumina-based catalyst 2 releases $NO_2$. In this way, before the silver-alumina-based catalyst 2 can no longer adsorb $NO_2$, the silver-alumina-based catalyst can be made to release $NO_2$. The thus released $NO_2$ can be purified by reduction at the activated $NO_x$ reduction catalyst 3 which is arranged at the downstream side of the silver-alumina-based catalyst 2 using the reducing substances in the rich air-fuel ratio exhaust gas.

Next, at step 114, the current $NO_2$ adsorption amount A2 at the silver-alumina-based catalyst 2 is reset to "0" and the flag F is set to "1". Due to this, the flow of the fourth flow chart is repeated. If the current $NO_2$ adsorption amount A2 at the silver-alumina-based catalyst 2 becomes the set amount AL, the flag F is again made "2", rich control is performed, the silver-alumina-based catalyst 2 is made to release the adsorbed $NO_2$, and this is purified by reduction at the $NO_x$ reduction catalyst 3. In this way, the frequency of rich control is minimized to suppress consumption of the fuel. In the third flow chart, at the instant in the second flow chart where the flag F is made "1" and the suppression of the temperature rise of the silver-alumina-based catalyst 2 is lifted, the judgment at steps 301 and 302 is affirmative, the flag F is set to "2", and rich control of step 113 of the first flow chart is sometimes performed.

Figure 5:
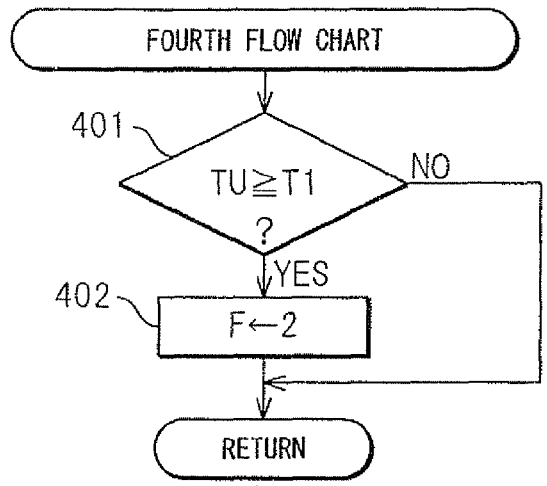
FIG. 5 is a fourth flow chart for setting a flag of the first flow chart of FIG. 2 to "2".

FIG. 5 is a fourth flow chart for setting the flag F at "2". This flow is performed only while the flag F is made "1" along with the third flow chart. First, at step 401, it is judged if the current temperature TU of the silver-alumina-based catalyst 2 which is estimated at step 101 of the first flow chart has reached the first set temperature T1 or not. The temperature TU of the silver-alumina-based catalyst 2 is prevented from becoming the first set temperature T1 by the silver-alumina-based catalyst 2 being arranged away from the engine body. Due to this, while usually the judgment at step 401 will never be affirmative, if affirmative, the flag F is made "2" at step 402.

Due to this, at step 113 of the first flow chart, the above-mentioned rich control is executed and the $NO_2$ which is released from the silver-alumina-based catalyst 2 when the first set temperature T1 is reached is purified by reduction at the $NO_x$ reduction catalyst 3 which is inevitably activated at this time using the reducing substances in the exhaust gas in the rich control. At this time, the $NO_2$ adsorption amount A2 of the silver-alumina-based catalyst 2 does not reach the set amount AL, but if becoming the first set temperature T1, the $NO_2$ ends up being released from the silver-alumina-based catalyst 2, so to prevent release into the atmosphere, rich control is performed to purify this by reduction at the $NO_x$ reduction catalyst 3.

Next, at step 114, the current $NO_2$ adsorption amount A2 at the silver-alumina-based catalyst 2 is reset to "0" and the flag F is made "1". Due to this, the flow of the fifth flow chart is repeated. When the temperature TU of the silver-alumina-based catalyst 2 becomes the first set temperature T1, the flag F is again made "2", rich control is performed, and the $NO_2$ which is released from the silver-alumina-based catalyst 2 is purified by reduction at the $NO_x$ reduction catalyst 3. In the fourth flow chart, at the instant in the second flow chart that the flag F is made "1" and the suppression of the temperature rise of the silver-alumina-based catalyst 2 is lifted, the judgment at step 401 is affirmative, the flag F is set to 2, and rich control of step 113 of the first flow chart is executed.

Figure 6:
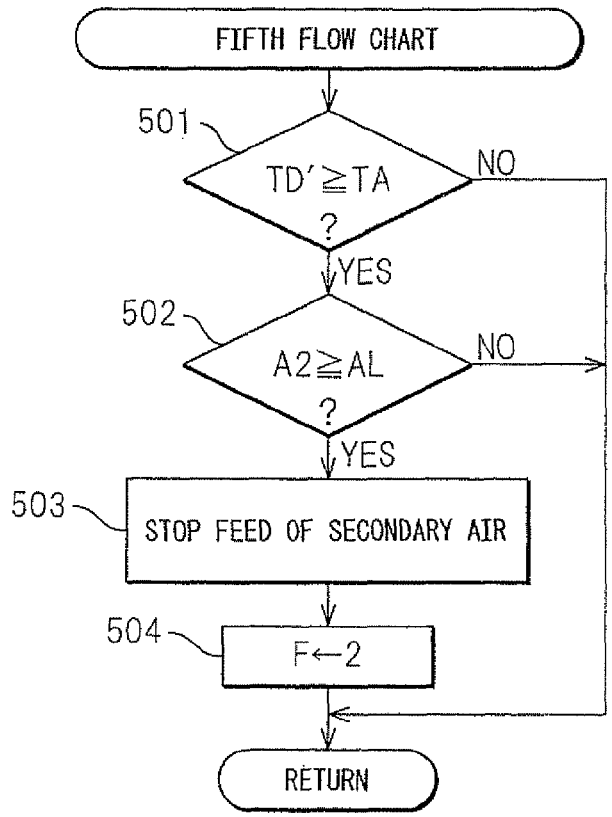
FIG. 6 is a fifth flow chart for setting a flag of the first flow chart of FIG. 2 to "2".

FIG. 6 is a fifth flow chart for setting the flag F at "2", which is different from the fourth flow chart and the fifth flow chart. This flow is performed only while the temperature rise of the silver-alumina-based catalyst 2 is suppressed by the secondary air feed passage 6. First, at step 501, it is judged if the estimated temperature TD' of the $NO_x$ reduction catalyst 3 due to the rapid temperature rise when lifting the suppression of the temperature rise of the silver-alumina-based catalyst 2 by the secondary air feed passage 6 is the activation temperature TA or more. Such an estimated temperature TD' of the $NO_x$ reduction catalyst 3 may be estimated based on the current temperature of the exhaust gas before cooling by the secondary air. When this judgment is negative, the routine ends as is.

On the other hand, if lifting the suppression of the temperature rise of the silver-alumina-based catalyst 2, when the $NO_x$ reduction catalyst 3 becomes the activation temperature TA or more, the judgment at step 501 is affirmative and, at step 502, it is judged if the current $NO_2$ adsorption amount A2 at the silver-alumina-based catalyst 2 has reached the set amount AL (for example, the $NO_2$ adsorption limit amount at the silver-alumina-based catalyst 2) or not. When this judgment is negative, the routine ends as is, but when this judgment is affirmative, at step 503, the feed of the secondary air by the secondary air feed passage 6 is stopped, while at the step 504, the flag F is made "2".

Due to this, at step 113 of the first flow chart, the above-mentioned rich control is executed. Thus the air-fuel ratio of the exhaust gas which flows into the silver-alumina-based catalyst 2 is made richer than the stoichiometric air-fuel ratio and even if the temperature of the silver-alumina-based catalyst 2 is not the first set temperature T1, the silver-alumina-based catalyst 2 is made to release $NO_2$. In this way, before the silver-alumina-based catalyst 2 can no longer adsorb $NO_2$, the silver-alumina-based catalyst is made to release the $NO_2$. The thus released $NO_2$ can be purified by reduction at the $NO_x$ reduction catalyst 3 activated which is arranged at the downstream side of the silver-alumina-based catalyst 2 using the reducing substances in the rich air-fuel ratio exhaust gas. Further, when lifting the suppression of the temperature rise of the silver-alumina-based catalyst 2, the NO adsorption amount A1 at the silver-alumina-based catalyst 2 is not zero, so the silver-alumina-based catalyst 2 also releases NO, but the released NO can also be purified by reduction at the $NO_x$ reduction catalyst 3 using the reducing substances in the rich air-fuel ratio exhaust gas.

In the fifth flow chart, if lifting the suppression of the temperature rise of the silver-alumina-based catalyst 2, when the $NO_x$ reduction catalyst 3 becomes the activation temperature TA or more, the judgment at step 501 is affirmative. At this time, regardless of the current $NO_2$ adsorption amount A2 at the silver-alumina-based catalyst 2, it is possible to stop the feed of the secondary air by the secondary air feed passage 6 and set the flag F at "2".

Due to this, at step 113 of the first flow chart, the above-mentioned rich control is executed, the air-fuel ratio of the exhaust gas which flows into the silver-alumina-based catalyst 2 is made richer than the stoichiometric air-fuel ratio, and, even if the temperature of the silver-alumina-based catalyst 2 is not the first set temperature T1, $NO_2$ is made to be released from the silver-alumina-based catalyst 2. The thus released $NO_2$ can be purified by reduction at the activated $NO_x$ reduction catalyst 3 which is arranged at the downstream side of the silver-alumina-based catalyst 2 by using the reducing substances in the exhaust gas of the rich air-fuel ratio. Further, NO is also released from the silver-alumina-based catalyst 2, but the released NO can also be purified by reduction at the $NO_x$ reduction catalyst 3 using the reducing substances in the exhaust gas of the rich air-fuel ratio.

As explained above, the silver-alumina-based catalyst 2 releases the $NO_2$ when the temperature becomes the first set temperature T1 if the air-fuel ratio of the inflowing exhaust gas is leaner than the stoichiometric air-fuel ratio, releases $NO_2$ also when the temperature becomes lower than the first set temperature T1 if the air-fuel ratio of the inflowing exhaust gas is richer than the stoichiometric air-fuel ratio, and, further, releases $NO_2$ at a lower temperature the smaller the air-fuel ratio of the exhaust gas. That is, at the silver-alumina-based catalyst 2, it is possible to set an upper limit air-fuel ratio for causing release of $NO_2$ for each temperature. If making the air-fuel ratio smaller than the upper limit air-fuel ratio at each temperature, the rate of release of $NO_2$ becomes faster the smaller the air-fuel ratio.

In this regard, in the rich control of step 113 of the first flow chart, making the $NO_2$ be released from the silver-alumina-based catalyst 2 as slowly as possible enables easier removal by reduction at the downstream side $NO_x$ reduction catalyst 3. For this reason, the rich air-fuel ratio of the rich control is preferably made the upper limit air-fuel ratio of each temperature TU. However, when the temperature TU of the silver-alumina-based catalyst 2 is the first set temperature T1, the upper limit air-fuel ratio becomes leaner than the stoichiometric air-fuel ratio, but with this, it is not possible to purify the $NO_2$ by reduction at the downstream side $NO_x$ reduction catalyst 3, so the air-fuel ratio is made a rich one slightly smaller than the stoichiometric air-fuel ratio. Further, the time during which the rich control is performed is preferably made longer the greater the $NO_2$ which is released from the silver-alumina-based catalyst 2, that is, the greater the $NO_2$ adsorption amount A2 of the silver-alumina-based catalyst 2, so as to sufficiently purify by reduction the $NO_2$ which is released from the silver-alumina-based catalyst 2 in the $NO_x$ reduction catalyst 3.

At the rich control, when making the air-fuel ratio of the exhaust gas which flows into the silver-alumina-based catalyst 2 richer than the stoichiometric air-fuel ratio, the air-fuel ratio of the exhaust gas which flows into the silver-alumina-based catalyst 2 is made the set rich air-fuel ratio for exactly the set time. The closer the set rich air-fuel ratio to the upper limit air-fuel ratio at each temperature of the silver-alumina-based catalyst, the more it is possible to slow the $NO_2$ release rate from the silver-alumina-based catalyst. In such rich control, the $NO_2$ release rate from the silver-alumina-based catalyst can be estimated on the basis of the set rich air-fuel ratio.

In this way, in the rich control, $NO_2$ is released from the silver-alumina-based catalyst 2 by the estimated $NO_2$ release rate. The $NO_2$ is purified by reduction by the $NO_x$ reduction catalyst 3 which is activated at this time, but if making the $NO_x$ reduction rate of the $NO_x$ reduction catalyst 3 the $NO_2$ release rate or more, it is possible to purify by reduction at the $NO_x$ reduction catalyst 3 almost all of the $NO_2$ which is released from the silver-alumina-based catalyst 2.

The $NO_x$ reduction rate of the $NO_x$ reduction catalyst 3 becomes faster the smaller the air-fuel ratio of the exhaust gas and becomes faster the higher the temperature TD of the $NO_x$ reduction catalyst 3. The air-fuel ratio of the exhaust gas is the set rich air-fuel ratio of the rich control. Due to this, it is possible to estimate the target temperature TDt of the $NO_x$ reduction catalyst 3 for giving rise to an $NO_x$ reduction rate which is equal to the $NO_2$ release rate of the silver-alumina-based catalyst 2.

Due to this, in the rich control, when the current temperature TD of the $NO_x$ reduction catalyst 3 is lower than the target temperature TDt, it is preferable to operate the electric heater 5 to raise the $NO_x$ reduction catalyst 3 in temperature to the target temperature TDt or more.

Further, at the time of the rich control, when making the silver-alumina-based catalyst 2 release the NO as well, it is preferable to make the target temperature TD1 higher so as to also purify by reduction the NO at the $NO_x$ reduction catalyst 3 so as to make the $NO_x$ reduction rate of the $NO_x$ reduction catalyst 3 higher.

As the reducing agent feed passage 4, it is also possible to use the fuel injector which injects fuel into a cylinder. The fuel injector may for example be used to inject additional fuel into the cylinder in the latter half of the exhaust stroke or the expansion stroke so as to realize the set rich air-fuel ratio of the rich control.

LIST OF REFERENCE NUMERALS

1: exhaust passage
2: silver-alumina-based catalyst
3: $NO_x$ reduction catalyst
4: reducing agent feed passage
5: electric heater
6: secondary air feed passage

The invention claimed is:
1. An exhaust purification system for an internal combustion engine, the exhaust purification system comprising:
a silver-alumina-based catalyst, which:
(i) comprises a base material, a carrier formed thereon, and silver oxide,
(ii) configured to be arranged in an engine exhaust system and,
(iii) when an air-fuel ratio of exhaust gas is leaner than a stoichiometric air-fuel ratio, releases adsorbed $NO_2$ at a first set temperature and releases adsorbed NO at a second set temperature, which is lower than the first set temperature,
a secondary air feed passage configured to suppress a temperature rise of the silver-alumina-based catalyst; and
an electronic control unit, that:
controls the air flow through the secondary air feed passage to:
when the silver-alumina-based catalyst has reached a third set temperature, which is lower than the second set temperature, suppress a temperature rise of the silver-alumina-based catalyst to maintain the silver-alumina-based catalyst near the third set temperature, and
then lift the suppression of the temperature rise of the silver-alumina-based catalyst so that at least part of the NO, which is adsorbed at the silver-alumina-based catalyst, is oxidized to $NO_2$ to be adsorbed at the silver-alumina-based catalyst.
2. The exhaust purification system as set forth in claim 1, wherein the electronic control unit:
is further configured to judge whether there is no longer any NO adsorbed at the silver-alumina-based catalyst, and
when it is judged that there is no longer any NO adsorbed at the silver-alumina-based catalyst, controls the air flow through the secondary air feed passage to lift the suppression of the temperature rise of the silver-alumina-based catalyst.

3. The exhaust purification system as set forth in claim 1, further comprising:
   a $NO_x$ reduction catalyst arranged at a downstream side of the silver-alumina-based catalyst; and
   a reducing agent feed passage,
   wherein the electronic control unit is further configured to:
      judge whether the $NO_x$ reduction catalyst is activated,
      judge whether the $NO_2$ amount adsorbed at the silver-alumina-based catalyst has reached a set amount, and
      when (i) the suppression of the temperature rise of the silver-alumina-based catalyst is lifted or after the suppression of the temperature rise of the silver-alumina-based catalyst is lifted, (ii) it is judged that the $NO_x$ reduction catalyst is activated and (iii) it is judged that the $NO_2$ amount adsorbed at the silver-alumina-based catalyst has reached the set amount, control the air flow through the reducing agent feed passage to make the air-fuel ratio of the exhaust gas, which flows into the silver-alumina-based catalyst richer than the stoichiometric air-fuel ratio.

4. The exhaust purification system as set forth in claim 1, further comprising:
   a $NO_x$ reduction catalyst arranged at a downstream side of the silver-alumina-based, catalyst; and
   a reducing agent feed passage,
   wherein the electronic control unit is further configured to, when (i) the suppression of the temperature rise of the silver-alumina-based catalyst is lifted or after the suppression of the temperature rise of the silver-alumina-based catalyst is lifted, and (ii) the silver-alumina-based catalyst has been raised in temperature to the first set temperature or higher, control the air flow through the reducing agent feed passage to make the air-fuel ratio of the exhaust gas, which flows into the silver-alumina-based catalyst richer than the stoichiometric air-fuel ratio.

5. The exhaust purification system as set forth in claim 1, further comprising:
   a $NO_x$ reduction catalyst arranged at a downstream side of the silver-alumina-based catalyst; and
   a reducing agent feed passage,
   wherein the electronic control unit is further configured to:
      judge whether the $NO_x$ reduction catalyst is activated,
      judge whether the $NO_2$ amount adsorbed at the silver-alumina-based catalyst has reached a set amount, and
      when (i) it is judged that the $NO_x$ reduction catalyst is activated if the suppression of the temperature rise of the silver-alumina-based catalyst is lifted, and (ii) it is judged that the $NO_2$ amount adsorbed at the silver-alumina-based catalyst has reached the set amount, control: (a) the air flow through the secondary air feed passage to lift the suppression of the temperature rise of the silver-alumina-based catalyst, and (b) the air flow through the reducing agent feed passage to make the air-fuel ratio of the exhaust gas, which flows into the silver-alumina-based catalyst, richer than the stoichiometric air-fuel ratio.

6. The exhaust purification system as set forth in claim 3, further comprising:
   an electric heater,
   wherein
      the electronic control unit is further configured to:
         estimate a target temperature of the $NO_x$ reduction catalyst, and
         control the electric heater to raise the temperature of the $NO_x$ reduction catalyst, and
      when the electronic control unit controls the air flow through the reducing agent feed passage to make the air-fuel ratio of the exhaust gas, which flows into the silver-alumina-based catalyst, richer than the stoichiometric air-fuel ratio, the electronic control unit:
         controls the air flow through the reducing agent feed passage to make the air-fuel ratio of the exhaust gas, which flows into the silver-alumina-based catalyst, a set rich air-fuel ratio at exactly a set time,
         estimates the target temperature of the $NO_x$ reduction catalyst for giving rise to a $NO_x$ reduction rate which is equal to a $NO_2$ release rate of the silver-alumina-based catalyst at the set time, and
         controls the electric heater to raise the temperature of the $NO_x$ reduction catalyst to the target temperature or higher.

7. The exhaust purification system as set forth in claim 1, further comprising:
   a $NO_x$ reduction catalyst arranged at a downstream side of the silver-alumina-based catalyst; and
   a reducing agent feed passage,
   wherein the electronic control unit is further configured to:
      judge whether the $NO_x$ reduction catalyst is activated, and
      when it is judged that the $NO_x$ reduction catalyst is activated if the suppression of the temperature rise of the silver-alumina-based catalyst is lifted, control: (i) the air flow through the secondary air feed passage to lift the suppression of the temperature rise of the silver-alumina-based catalyst and (ii) the air flow through the reducing agent feed passage to make the air-fuel ratio of the exhaust gas, which flows into the silver-alumina-based catalyst, richer than the stoichiometric air-fuel ratio.

8. The exhaust purification system as set forth in claim 2, further comprising:
   a $NO_x$ reduction catalyst arranged at a downstream side of the silver-alumina-based catalyst; and
   a reducing agent feed passage,
   wherein the electronic control unit is further configured to:
      judge whether the $NO_x$ reduction catalyst is activated,
      judge whether the $NO_2$ amount adsorbed at the silver-alumina-based catalyst has reached a set amount, and
      when (i) the suppression of the temperature rise of the silver-alumina-based catalyst is lifted or after the suppression of the temperature rise of the silver-alumina-based catalyst is lifted, (ii) it is judged that the $NO_x$ reduction catalyst is activated and (iii) it is judged that the $NO_2$ amount adsorbed at the silver-alumina-based catalyst has reached the set amount, control the air flow through the reducing agent feed passage to make the air-fuel ratio of the exhaust gas which flows into the silver-alumina-based catalyst richer than the stoichiometric air-fuel ratio.

9. The exhaust purification system as set forth in claim 2, further comprising:
   a $NO_x$ reduction catalyst arranged at a downstream side of the silver-alumina-based catalyst; and
   a reducing agent feed passage,
   wherein the electronic control unit is further configured to, when (i) the suppression of the temperature rise of the silver-alumina-based catalyst is lifted or after the suppression of the temperature rise of the silver-alumina-based catalyst is lifted and (ii) if the silver-alumina-based catalyst has been raised in temperature to the first set temperature or higher, control the air flow through the reducing agent feed passage to make the air-fuel ratio of the exhaust gas, which flows into the silver-alumina-based catalyst richer than the stoichiometric air-fuel ratio.

10. The exhaust purification system as set forth in claim 4, further comprising:
an electric heater,
wherein
the electronic control unit is further configured to:
estimate a target temperature of the $NO_x$ reduction catalyst, and
control the electric heater to raise the temperature of the $NO_x$ reduction catalyst, and
when the electronic control unit controls the air flow through the reducing agent feed passage to make the air-fuel ratio of the exhaust gas, which flows into the silver-alumina-based catalyst, richer than the stoichiometric air-fuel ratio, the electronic control unit:
controls the air flow through the air flow through the reducing agent feed passage to make the air-fuel ratio of the exhaust gas, which flows into the silver-alumina-based catalyst, a set rich air-fuel ratio at exactly a set time,
estimates the target temperature of the $NO_x$ reduction catalyst for giving rise to a $NO_x$ reduction rate which is equal to a $NO_2$ release rate of the silver-alumina-based catalyst at the set time, and
controls the electric heater to raise the temperature of the $NO_x$ reduction catalyst to the target temperature or higher.

11. The exhaust purification system as set forth in claim 5, further comprising:
an electric heater,
wherein
the electronic control unit is further configured to:
estimate a target temperature of the $NO_x$ reduction catalyst, and
control the electric heater to raise the temperature of the $NO_x$ reduction catalyst, and
when the electronic control unit controls the air flow through the reducing agent feed passage to make the air-fuel ratio of the exhaust gas, which flows into the silver-alumina-based catalyst, richer than the stoichiometric air-fuel ratio, the electronic control unit:
controls the air flow through the reducing agent feed passage to make the air-fuel ratio of the exhaust gas, which flows into the silver-alumina-based catalyst, a set rich air-fuel ratio at exactly a set time,
estimates the target temperature of the $NO_x$ reduction catalyst for giving rise to a $NO_x$ reduction rate which is equal to a $NO_2$ release rate of the silver-alumina-based catalyst at the set time, and
controls the electric heater to raise the temperature of the $NO_x$ reduction catalyst to the target temperature or higher.

12. The exhaust purification system as set forth in claim 8, further comprising:
an electric heater,
wherein
the electronic control unit is further configured to:
estimate a target temperature of the $NO_x$ reduction catalyst, and
control the electric heater to raise the temperature of the $NO_x$ reduction catalyst, and
when the electronic control unit controls the air flow through the reducing agent feed passage to make the air-fuel ratio of the exhaust gas, which flows into the silver-alumina-based catalyst, richer than the stoichiometric air-fuel ratio, the electronic control unit:
controls the air flow through the reducing agent feed passage to make the air-fuel ratio of the exhaust gas, which flows into the silver-alumina-based catalyst, a set rich air-fuel ratio at exactly a set time,
estimates the target temperature of the $NO_x$ reduction catalyst for giving rise to a $NO_x$ reduction rate which is equal to a $NO_2$ release rate of the silver-alumina-based catalyst at the set time, and
controls the electric heater to raise the temperature of the $NO_x$ reduction catalyst to the target temperature or higher.

13. The exhaust purification system as set forth in claim 9, further comprising:
an electric heater,
wherein
the electronic control unit is further configured to:
estimate a target temperature of the $NO_x$ reduction catalyst, and
control the electric heater to raise the temperature of the $NO_x$ reduction catalyst, and
when the electronic control unit controls the air flow through the reducing agent feed passage to make the air-fuel ratio of the exhaust gas, which flows into the silver-alumina-based catalyst, richer than the stoichiometric air-fuel ratio, the electronic control unit:
controls the air flow through the reducing agent feed passage to make the air-fuel ratio of the exhaust gas, which flows into the silver-alumina-based catalyst, a set rich air-fuel ratio at exactly a set time,
estimates the target temperature of the $NO_x$ reduction catalyst for giving rise to a $NO_x$ reduction rate which is equal to a $NO_2$ release rate of the silver-alumina-based catalyst at the set time, and
controls the electric heater to raise the temperature of the $NO_x$ reduction catalyst to the target temperature or higher.

* * * * *